United States Patent [19]

Schotte

[11] Patent Number: 5,619,902
[45] Date of Patent: Apr. 15, 1997

[54] METHOD FOR CONTROLLING A PUMP FOR DELIVERING THE WATER IN AN APPARATUS FOR THE PRODUCTION OF BREWED BEVERAGES, AS WELL AS SUCH AN APPARATUS

[75] Inventor: Dietwald Schotte, Eschborn, Germany

[73] Assignee: Braun Aktiengesellschaft, Kronberg, Germany

[21] Appl. No.: 497,644

[22] Filed: Jun. 30, 1995

[30] Foreign Application Priority Data

Jul. 29, 1994 [DE] Germany .......................... 44 26 983.8
Sep. 23, 1994 [DE] Germany ...................... 94 15 400.7 U

[51] Int. Cl.$^6$ ................................................. A47J 31/00
[52] U.S. Cl. .................................................... 99/281
[58] Field of Search ........................... 99/279, 280, 281, 99/282, 283, 299, 285; 426/433

[56] References Cited

U.S. PATENT DOCUMENTS 2,715,868  8/1955  Brown .
4,208,957  6/1980  Bollman ................................ 99/282
5,014,611  5/1991  Illy et al. .............................. 99/280
5,375,508  12/1994  Knepler ................................ 99/283

FOREIGN PATENT DOCUMENTS

0427666A1  10/1990  European Pat. Off. .
2295720  12/1975  France .
2495923  12/1981  France .
7827682  9/1978  Germany .

OTHER PUBLICATIONS

European Search Report dated Oct. 5, 1995, EP 95 109374.

*Primary Examiner*—Robert W. Jenkins
*Attorney, Agent, or Firm*—Fish & Richardson P.C.

[57] ABSTRACT

The invention is directed to method for controlling a pump for delivering the water in an apparatus for the production of brewed beverages, in particular espresso, coffee, cappuccino, wherein a switch is provided which, on actuation, starts the pump. The pump is started both when a temperature requirement is satisfied and when the switch is actuated, with the pump being started only if actuation of the switch has occurred after the temperature requirement is met.

5 Claims, 3 Drawing Sheets

METHOD FOR CONTROLLING A PUMP FOR DELIVERING THE WATER IN AN APPARATUS FOR THE PRODUCTION OF BREWED BEVERAGES, AS WELL AS SUCH AN APPARATUS

This invention relates to a method for controlling a pump for delivering the water in an apparatus for the production of brewed beverages, as well as such an apparatus.

An apparatus of this type is already known under the type designation ES-15. In this apparatus, when a first switch is actuated, electric current is supplied to a heating device. Further, this apparatus includes a pump adapted to be turned on by a separate switch. When this pump switch is actuated at an instant of time when the heating device is still in a cold state, the pump does not start. The pump will then start automatically at the instant of time when the heating device has reached a specified temperature. In operation, the pump feeds cold water through the heating device, the water being suitably heated on its path through the heating device. On leaving the heating device, the water is forced through the espresso grounds by the pressure generated by the pump, to be subsequently collected in a container which is customarily a cup.

By contrast, in the subject-matter of the present invention, actuation of the pump occurs in a different manner.

According to one aspect of the invention pump operation start at an instant of time that occurs for the user in a clearly recognizable and identifiable way when the pump is turned on by the user. In a retrospect comparison with the prior art it thus shows that the user cannot actuate the pump switch when the heater is cold. The pump starts running at a correspondingly later moment which occurs only when the temperature requirement is met at the instant the user actuates the switch.

An advantageous effect thereby achieved is that the operating safety of such an apparatus is improved in contrast to the prior art known. In the prior art known, the user may actuate the pump switch without pump operation starting, because the temperature requirement is not as yet satisfied. If, for example, the user then wishes to put a carafe in the place of the containers intended to collect the brewed beverage as, for example, cups, having his hand beneath the discharge port the moment the pump starts operating, his hand runs the risk of being scalded. By contrast, the subject-matter of the present invention ensures that the pump is allowed to start promptly only if the user has actuated the pump switch. This precludes starting of the pump at an unexpected moment.

In a preferred embodiment there is a beneficial effect of the invention if the beverage-brewing apparatus includes a device for the preheating of cups. Such a cup preheating device is advantageously configured such that the water is heated to the proper operating temperature in an open heating reservoir. In this arrangement, the use of an open heating reservoir means that the water is not pressurized as it is heated. Such an open reservoir includes in particular on its upper side orifices enabling steam to escape which forms as the water is heated. A cup preheating function is performed in that the cups are arranged to cover these orifices at least in part during heating of the water, thus becoming heated by the exiting steam. Without the switch of the invention, when the user of the apparatus, on placing the cups down onto the upper side of the heating reservoir for preheating, subsequently directs his attention away from the apparatus because, for example, he leaves the room, an automatic start of the apparatus after the appropriate temperature is reached results in the brewed beverage being delivered although no collection container is placed underneath the discharge port. According to the invention only water that has been heated to the proper temperature can be delivered and the possibility of the pump starting unexpectedly is obviated. As a result, prior to putting the pump in operation, the user is in a position to make sure that a collection container is placed underneath the discharge port. This makes it substantially easier for the user to preheat the cups for the brewing of beverages.

It is advantageous that it is indicated to the user if and when the temperature requirement is met, thus enabling the user to recognize clearly the instant pump operation starts when he actuates the pump switch.

It is an advantage that the water has reached a clearly defined temperature when pump operation starts. This advantage comes to bear particularly if a configuration other than that of prior-art arrangements is utilized. If the pump does not feed cold water through a heating device and if, instead, the water is first heated to the appropriate temperature by a heating device and subsequently fed by the pump, so that the water is pressurized to a certain degree, the temperature of the water is clearly defined. In the known prior art, the parameters such as water temperature and water pressure are not adjustable independently of each other. On an increase in the flow rate of the pump, the system pressure increases, while at the same time the water temperature diminishes because the duration for which the water remains in the heating device is reduced by reason of the increase in the flow rate. In the control method according to the prior art, an independent adjustment of temperature and pressure is accordingly not possible.

By predetermining at the same time a maximum value for the temperature, it can be ensured that the temperature of the water is in the optimum range for the production of espresso. This temperature range is between 92° C. and 94° C.

An embodiment of the present invention will be described in more detail in the following with reference to the accompanying drawings. In the drawings, FIG. 1 is a schematic circuit diagram of an arrangement for implementing the method;

Figure 1:
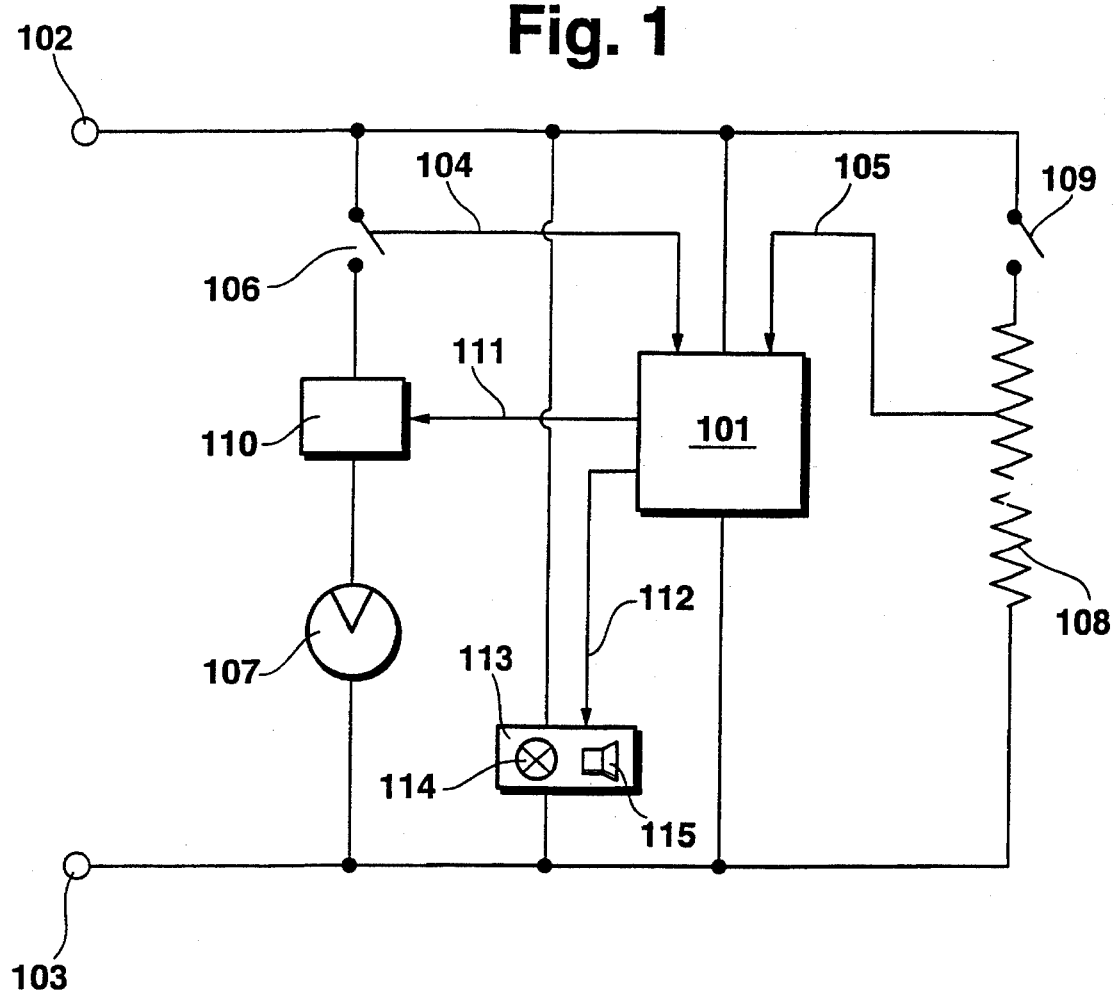

In the representation of FIG. 1, an electric voltage energizing a microcontroller 101 is applied to terminals 102 and 103. As this occurs, signals 104 and 105 are delivered to the microcontroller 101. Signal 104 is a signal indicative of the position of a switch 106. This switch 106 is actuated by the user to turn on a pump 107. Signal 105 is representative of the temperature issuing from a heating element 108. This temperature can be the temperature of the heating element 108 itself or, alternatively, the temperature of the water to be heated by the current flowing through the heating element 108. The heating element is adapted to be energized from the voltage source by the user closing a switch 109. The switch 106 may be of the type including at least two positions. Signal 104 may be formed in the manner of a flip-flop, that is, each actuation of the switch causes a corresponding variation of the value of this flip-flop which may assume either one of two values. Further, a controllable switching device 110 is provided which may be, for example, a transistor or, alternatively, a Triac adapted to be driven by the microcontroller 101 via a signal line 111. This controllable switching device 110 is initially held in the open position by the microcontroller 101. Via the signal line 111, the controllable switching device 110 is only closed if the signal 104, which is indicative of an actuation of the switch 106 to the position "Pump On", is fed to the microcontroller 101 only at the instant the microcontroller 101 receives through the signal line 105 a signal indicating that the temperature requirement is satisfied. It is thereby ensured that the pump 107 is only allowed to start if the user actuates the switch 106 after the corresponding temperature requirement is met.

Advantageously, at the instant of time when the temperature requirement is met, an annunciator device 113 is driven via a signal line 112, which device may include, for example, a visual indicator 114 as a lamp, and/or an audible indicator 115. The visual indicator may be configured such that a red light-emitting diode lights during the heating cycle, while a green lightemitting diode is driven when the temperature requirement is met. This thus provides an indication to the user of when the temperature requirement is met and that the pump actually does start on actuation of the switch 106.

Figure 2:
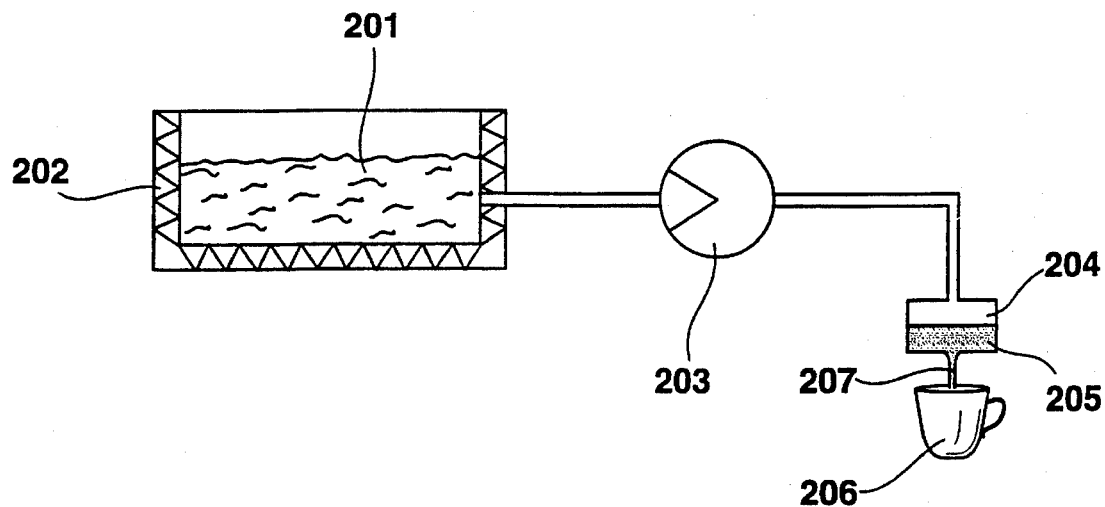
FIG. 2 is a view of an advantageous pump arrangement in relation to the water heating device.

FIG. 2 shows a water reservoir 201 surrounded by a heating device 202. This heating device 202 corresponds to the heating element 108 of FIG. 1. In this arrangement, the pump 203 feeds the heated water from the water reservoir 201 to the container 204 holding the espresso grounds. On its way to the container 204 holding the espresso grounds, the water is thus pressurized by the pump and forced through the espresso grounds 205 at this particular pressure. After the water has exited the discharge port 207, it is collected in the collection container 206. This arrangement of the pump between the container 204 holding the espresso grounds and the water reservoir 201 with its heating device 202 has the advantageous effect that, in combination with the method of the present invention, the pump does not start until the water in the water reservoir 201 has reached a defined temperature. The temperature of the water can be determined, for example, by configuring the heating device as an NTC or PTC resistor. The temperature is then obtained from the resistance value which is in turn derivable from the current flowing through the resistor at the corresponding voltage.

Figure 3:
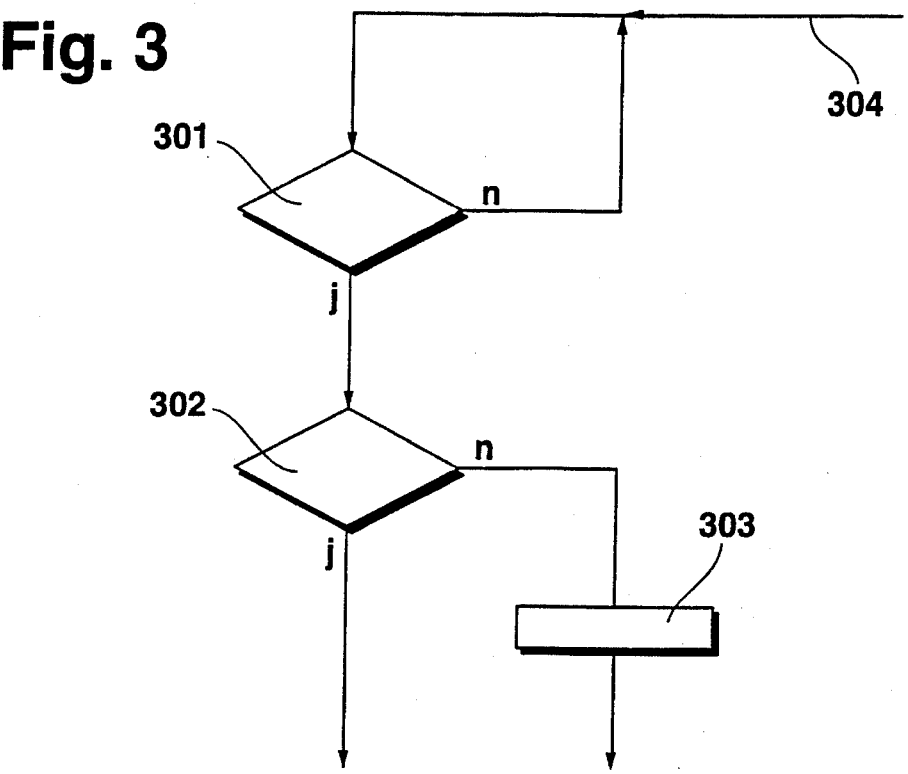
FIG. 3 is a flowchart illustrating a sequence of the method of the present invention.

FIG. 3 shows a flowchart of the method of the present invention. The succession of operations illustrated occurs, in accordance with the arrow 304, after the user has turned on the heating device. According to the representation of FIG. 1, this means that the user has closed the switch 109. The process then starts with a step 301 in which a check is made to determine whether the temperature requirement is satisfied. According to the explanations given with reference to FIG. 1, this temperature requirement may be considered satisfied if the heating device itself has reached a specified temperature or alternatively, in a pump arrangement according to FIG. 2, if the water in the water reservoir 201 has reached a specified temperature. If neither is the case, the program returns to the start of the process. In an implementation involving a microcontroller, a specified clock frequency exists at which this program sequence is restarted. If it is determined in step 301 that the temperature requirement is met, the program proceeds with the next step 302. Step 302 then checks whether the user has closed the pump switch. If this is not the case, the controllable switching device is driven in accordance with step 303. This then terminates the process cycle, that is, from this moment on the pump is adapted to be energized from the voltage source by actuation of the pump switch. The pump thus starts running when the pump switch is actuated.

If the test in step 302 produces the answer yes, that is, the pump switch is already in the "On" position at the instant the temperature requirement is met, the process cycle is immediately interrupted. Since in this condition the controllable switching device 110 has not been driven yet, the pump accordingly does not start. This process cycle according to FIG. 3 occurs if the pump is turned on and off by a switch that includes at least two switch positions.

Figure 4:
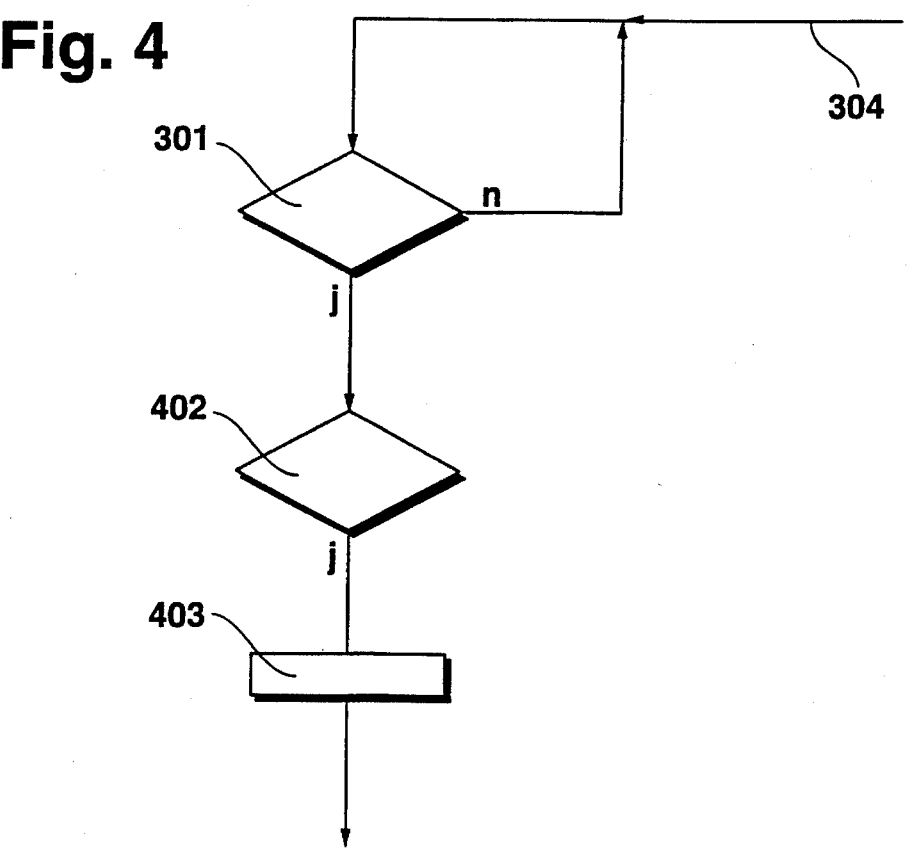
FIG. 4 is a flowchart illustrating a further sequence of the method of the present invention.

By contrast, if a switch is involved which a microcontroller tests for actuation and which, if an actuation is established, causes the microcontroller to drive a controllable switching device, the process cycle proceeds according to the method of FIG. 4. Tests and process cycle steps that are identical to the description of FIG. 3 are assigned like reference numerals. A new description of FIG. 4 is therefore dispensed with.

If the test in step 301 produces the answer yes, the program proceeds with step 402 in which it is checked whether switch 106 is actuated. If it is, the program proceeds to step 403 in which the controllable switching device 110 is activated to the "On" position. At the same time (in this event, the switch 106 is also driveable by the microcontroller), the switch 106 is equally closed by the microcontroller.

In such a configuration, the switch 106 may be omitted in the pump circuit. A schematic circuit diagram illustrating such an arrangement is shown in FIG. 5.

Figure 5:
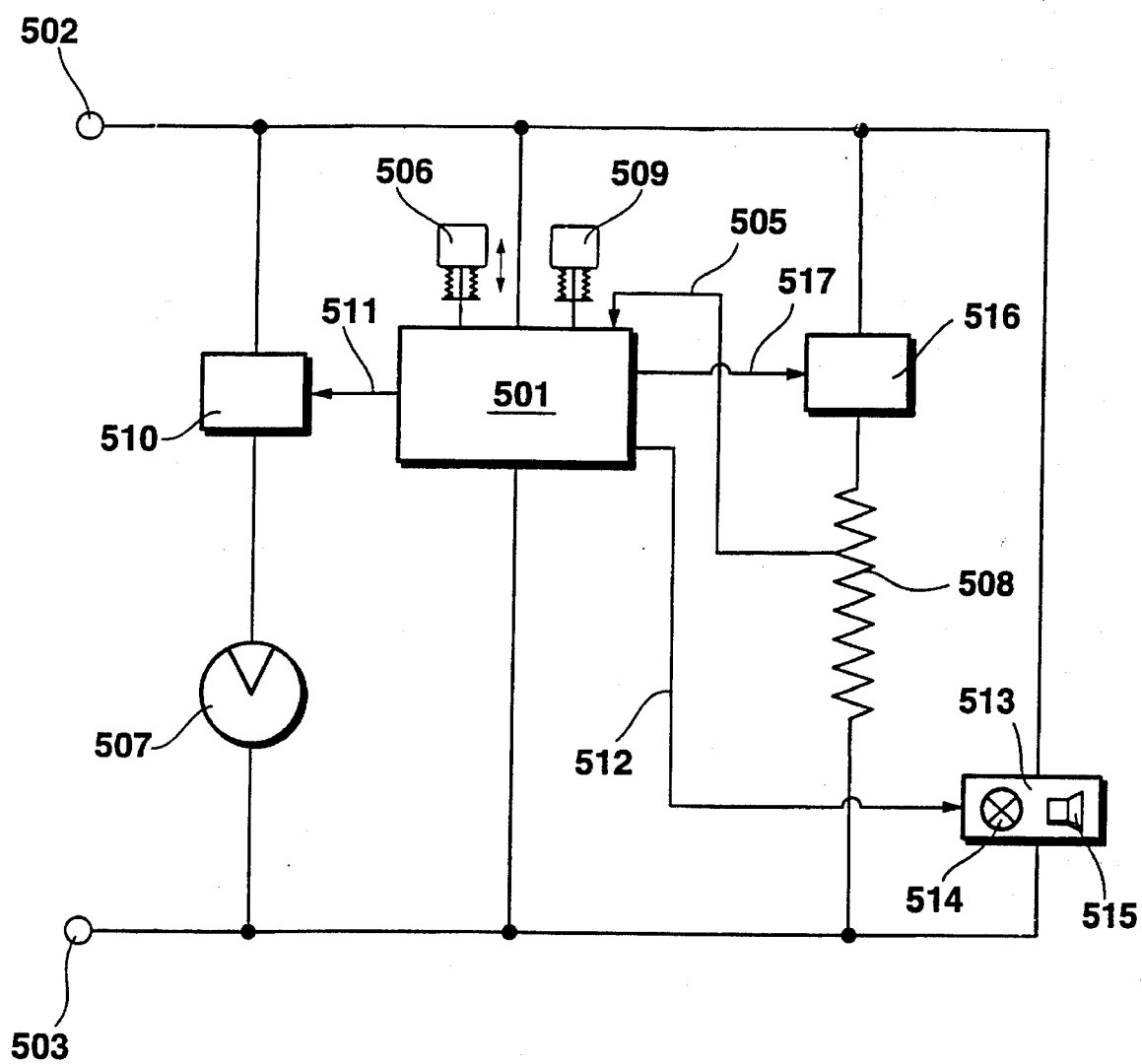
FIG. 5 is a schematic circuit diagram of another arrangement for implementing the method.

In the representation of FIG. 5, an electric voltage energizing a microcontroller 501 is applied to terminals 502 and 503. By means of push buttons 506 and 509 and the signal line 505, signals are delivered to the microcontroller 501. In this arrangement, the user actuates the push button 506 to turn the pump 507 on and off. The microcontroller 501 tests for actuation of the push button 506. If the answer is yes, the microcontroller can drive, via the signal line 511, a controllable switching device 510 energizing or de-energizing the pump 507. Signal 505 is representative of the temperature issuing from a heating element 508. This temperature can be the temperature of the heating element 508 itself, or alternatively, the temperature of the water to be heated by the current flowing through the heating element 508. The heating element 508 is adapted to be energized from the voltage source by the user actuating a push button 509. On actuation of the push button 509, the microcontroller 501 opens or closes a controllable switching device 516 via the signal line 517. The controllable switching device 510 as well as the controllable switching device 516 may be a transistor or also a Triac, for example.

The microcontroller 501 initially maintains the controllable switching device 510 in the open position. Via the signal line 511, the controllable switching device 510 is closed only if the push button 506 is not actuated until the signal line 505 delivers to the microcontroller 501 a signal indicating that the temperature requirement is met. This ensures that the pump 507 is allowed to start only if the user actuates the push button 506 after the appropriate temperature requirement is satisfied.

Advantageously, at the instant of time when the temperature requirement is fulfilled, an annunciator device 513 is driven via the signal line 512, which device may include, for example, a visual indicator 514 as a lamp and/or an audible indicator 515. The visual indicator may be configured such that a red light-emitting diode lights during the heating cycle, while a green light-emitting diode is driven when the temperature requirement is met. This thus provides an indication to the user of when the temperature requirement is met and that the pump actually does start on actuation of the push button 506.

I claim:

1. A machine for the production of brewed beverages, comprising:

a pump for delivering a liquid to a brewing device, a user controlled switch which during activation generates a switch signal, a temperature sensor which measures the liquid temperature, said temperature sensor providing a temperature signal related to the liquid temperature, and a controller which during operation receives said switch signal and said temperature signal, said controller starting said pump only if said switch signal is received after said temperature signal indicates a desired minimum temperature of the liquid.

2. The machine of claim 1 further comprising a switching device controlled by said controller, said controller closing said switching device to provide power to said pump only if said switch signal is received by said controller after said temperature signal indicates the desired minimum temperature.

3. The machine of claim 6 further comprising a visual annunciator device for displaying when said temperature signal indicates the desired minimum temperature.

4. The machine of claim 1 further comprising an audible annunciator device for broadcasting when said temperature signal indicates the desired minimum temperature.

5. The machine of claim 1 wherein said temperature signal indicates when said fluid temperature is within a desired range, said controlling sending a start signal to said pump only if said switch signal is received after said temperature signal indicates said fluid temperature in said desired range.

* * * * *

UNITED STATES PATENT AND TRADEMARK OFFICE
CERTIFICATE OF CORRECTION

PATENT NO. : 5,619,902
DATED : April 15, 1997
INVENTOR(S) : Dietwald Schotte

It is certified that error appears in the above-identified patent and that said Letters Patent is hereby corrected as shown below:

Col. 6, l. 5, "6" should be --1--.

Signed and Sealed this

Thirteenth Day of April, 1999

Attest:

Q. TODD DICKINSON

*Attesting Officer*  *Acting Commissioner of Patents and Trademarks*